(12) United States Patent
Kim et al.

(10) Patent No.: US 9,319,710 B2
(45) Date of Patent: Apr. 19, 2016

(54) VIDEO ENCODING AND DECODING APPARATUS AND METHOD

(75) Inventors: Hayoon Kim, Gyeonggi-do (KR); Haekwang Kim, Seoul (KR); Byeungwoo Jeon, Gyeonggi-do (KR); Yunglyul Lee, Seoul (KR); Joohee Moon, Seoul (KR); Jie Jia, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 716 days.

(21) Appl. No.: 13/002,582

(22) PCT Filed: Jun. 26, 2009

(86) PCT No.: PCT/KR2009/003457
§ 371 (c)(1),
(2), (4) Date: Mar. 29, 2011

(87) PCT Pub. No.: WO2010/002148
PCT Pub. Date: Jan. 7, 2010

(65) Prior Publication Data
US 2011/0176605 A1     Jul. 21, 2011

(30) Foreign Application Priority Data

Jul. 4, 2008 (KR) .................... 10-2008-0064903

(51) Int. Cl.
*H04N 19/577* (2014.01)
*H04N 19/93* (2014.01)

(52) U.S. Cl.
CPC ............ *H04N 19/577* (2014.11); *H04N 19/93* (2014.11)

(58) Field of Classification Search
CPC ............................ H04N 7/26; H04N 19/577
USPC ..................................... 375/240.03
See application file for complete search history.

(56) References Cited

U.S. PATENT DOCUMENTS

| | | | |
|---|---|---|---|
| 6,646,578 B1 * | 11/2003 | Au .................................. | 341/67 |
| 7,161,509 B2 * | 1/2007 | Naito ...................... | H03M 7/42 |
| | | | 341/67 |
| 7,978,762 B2 * | 7/2011 | Koyama et al. ............... | 375/240 |
| 8,090,025 B2 * | 1/2012 | Sakazume ................ | 375/240.16 |

(Continued)

FOREIGN PATENT DOCUMENTS

| | | |
|---|---|---|
| KR | 1020050011734 | 1/2005 |
| KR | 1020060082609 | 7/2006 |

(Continued)

OTHER PUBLICATIONS

International Search Report mailed Feb. 18, 2010 for PCT/KR2009/003457.

*Primary Examiner* — Richard Torrente
*Assistant Examiner* — Irfan Habib
(74) *Attorney, Agent, or Firm* — Hauptman Ham, LLP

(57) ABSTRACT

Video encoding and its corresponding decoding are disclosed. The video encoding incorporates: a predictor for predicting a pixel value of each pixel in a current block of the video to generate a predicted pixel value; a subtractor for calculating a difference between an original pixel value of the pixel in the current block and the predicted pixel value of the pixel in the current block to generate a residual signal; a transformer for transforming the residual signal into frequency coefficients; a quantizer for quantizing the transformed frequency coefficients; and an encoder for encoding the quantized frequency coefficients by using one of different variable length coding tables.

13 Claims, 22 Drawing Sheets

(56) References Cited

U.S. PATENT DOCUMENTS

| | | | | |
|---|---|---|---|---|
| 8,320,447 | B2* | 11/2012 | Miyazaki | 375/240.01 |
| 8,395,634 | B2* | 3/2013 | Ando et al. | 345/555 |
| 2004/0066974 | A1* | 4/2004 | Karczewicz et al. | 382/239 |
| 2004/0071451 | A1* | 4/2004 | Chujoh | H04N 19/52 386/201 |
| 2004/0120404 | A1* | 6/2004 | Sugahara | G01L 19/24 375/240.23 |
| 2005/0156761 | A1* | 7/2005 | Oh | H03M 7/40 341/67 |
| 2005/0259742 | A1* | 11/2005 | Hellman | 375/240.23 |
| 2006/0109912 | A1* | 5/2006 | Winger | H04B 1/66 375/240.23 |
| 2006/0126743 | A1* | 6/2006 | Takekawa et al. | 375/240.23 |
| 2006/0126744 | A1* | 6/2006 | Peng et al. | 375/240.26 |
| 2006/0156204 | A1* | 7/2006 | Lee et al. | 714/779 |
| 2007/0041449 | A1* | 2/2007 | Bjontegaard et al. | 375/240.18 |
| 2007/0071102 | A1* | 3/2007 | Wang | 375/240.18 |
| 2007/0110161 | A1* | 5/2007 | Saigo et al. | 375/240.16 |
| 2007/0120711 | A1* | 5/2007 | Hu et al. | 341/50 |
| 2007/0262886 | A1* | 11/2007 | Kim et al. | 341/50 |
| 2007/0274392 | A1* | 11/2007 | Tseng | H04N 19/61 375/240.23 |
| 2008/0074296 | A1* | 3/2008 | Kadono | G11B 20/1426 341/67 |
| 2008/0089423 | A1* | 4/2008 | Karczewicz | H04N 19/159 375/240.23 |
| 2009/0097548 | A1* | 4/2009 | Karczewicz | H04N 19/61 375/240.03 |
| 2009/0175334 | A1* | 7/2009 | Ye | H04N 19/105 375/240.12 |
| 2009/0175349 | A1* | 7/2009 | Ye | H04N 19/70 375/240.23 |
| 2009/0279598 | A1* | 11/2009 | Moriya | G10L 19/0017 375/240 |
| 2009/0316792 | A1* | 12/2009 | Shigemoto | H04N 19/42 375/240.18 |
| 2010/0260258 | A1* | 10/2010 | Ueda | H04N 19/70 375/240.03 |
| 2011/0248873 | A1* | 10/2011 | Karczewicz | H03M 7/46 341/67 |

FOREIGN PATENT DOCUMENTS

| | | |
|---|---|---|
| KR | 1020080004855 | 1/2008 |
| WO | 2008013020 | 1/2008 |

* cited by examiner

| run_before zero left | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | 1 | 1 | | | | | | | | | | | | | |
| 2 | 1 | 2 | 2 | | | | | | | | | | | | |
| 3 | 2 | 2 | 2 | 2 | | | | | | | | | | | |
| 4 | 2 | 2 | 2 | 3 | 3 | | | | | | | | | | |
| 5 | 2 | 2 | 3 | 3 | 3 | 3 | | | | | | | | | |
| 6 | 2 | 3 | 3 | 3 | 3 | 3 | 3 | | | | | | | | |
| ABOVE 6 | 3 | 3 | 3 | 3 | 3 | 3 | 3 | 4 | 5 | 6 | 7 | 8 | 9 | 10 | 11 |

(a)

| run_before | zerosLeft | | | | | | |
|---|---|---|---|---|---|---|---|
| | 1 | 2 | 3 | 4 | 5 | 6 | >6 |
| 0 | 1 | 1 | 11 | 11 | 11 | 11 | 111 |
| 1 | 0 | 01 | 10 | 10 | 10 | 000 | 110 |
| 2 | - | 00 | 01 | 01 | 011 | 001 | 101 |
| 3 | - | - | 00 | 001 | 010 | 011 | 100 |
| 4 | - | - | - | 000 | 001 | 010 | 011 |
| 5 | - | - | - | - | 000 | 101 | 010 |
| 6 | - | - | - | - | - | 100 | 001 |
| 7 | - | - | - | - | - | - | 0001 |
| 8 | | - | - | - | - | - | 00001 |
| 9 | - | - | - | - | - | - | 000001 |
| 10 | - | - | - | - | - | - | 0000001 |
| 11 | - | - | - | - | - | - | 00000001 |
| 12 | - | - | - | - | - | - | 000000001 |
| 13 | - | - | - | - | - | - | 0000000001 |
| 14 | - | - | - | - | - | - | 00000000001 |

| run_before / zero_left | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | 1 | 1 | | | | | | | | | | | | | |
| 2 | 2 | 2 | 1 | | | | | | | | | | | | |
| 3 | 3 | 3 | 2 | 1 | | | | | | | | | | | |
| 4 | 2 | 4 | 4 | 3 | 2 | 2 | | | | | | | | | |
| 5 | 3 | 3 | 3 | 3 | 3 | 3 | 2 | | | | | | | | |
| 6 | 2 | 3 | 3 | 3 | 3 | 3 | 3 | | | | | | | | |
| 7 | 3 | 4 | 3 | 3 | 3 | 3 | 3 | 3 | | | | | | | |
| 8 | 3 | 4 | 5 | 3 | 3 | 3 | 3 | 3 | 3 | | | | | | |
| 9 | 3 | 3 | 5 | 6 | 4 | 3 | 3 | 3 | 3 | 3 | | | | | |
| 10 | 6 | 4 | 3 | 5 | 7 | 3 | 3 | 3 | 3 | 3 | 3 | | | | |
| 11 | 3 | 6 | 7 | 5 | 3 | 8 | 3 | 3 | 4 | 3 | 3 | 3 | | | |
| 12 | 9 | 3 | 5 | 6 | 3 | 3 | 7 | 8 | 4 | 5 | 4 | 3 | 3 | | |
| 13 | 9 | 10 | 3 | 3 | 3 | 3 | 5 | 8 | 6 | 4 | 3 | 3 | 7 | 3 | |
| 14 | 3 | 3 | 4 | 3 | 3 | 3 | 5 | 6 | 7 | 8 | 9 | 10 | 10 | 3 | 3 |

*FIG. 6*

| zerosLeft | \multicolumn{15}{c}{Run_before (nonzeros_left = 2)} |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 1 | 1 | 0 | | | | | | | | | | | | | |
| 2 | 01 | 1 | | | | | | | | | | | | | |
| 3 | 000 | 001 | 01 | 1 | | | | | | | | | | | |
| 4 | 0000 | 0001 | 001 | 01 | 1 | | | | | | | | | | |
| 5 | 11 | 0000 | 0001 | 001 | 10 | 01 | | | | | | | | | |
| 6 | 010 | 100 | 101 | 001 | 000 | 011 | 11 | | | | | | | | |
| 7 | 000 | 001 | 010 | 011 | 100 | 101 | 110 | 111 | | | | | | | |
| 8 | 001 | 0000 | 0001 | 010 | 011 | 100 | 101 | 110 | 111 | | | | | | |
| 9 | 001 | 0001 | 00001 | 00001 | 0001 | 010 | 011 | 100 | 101 | 110 | 111 | | | | |
| 10 | 000000 | 001 | 0000000 | 000001 | 000001 | 0000001 | 000001 | 0001 | 0001 | 001 | 101 | | | | |
| 11 | 001 | 000000 | 001 | 010 | 010 | 011 | 011 | 000001 | 100 | 0001 | 110 | 111 | | | |
| 12 | 00000000 | 001 | 0000001 | 010 | 011 | 0000001 | 0000001 | 000001 | 0001 | 100 | 101 | 110 | 111 | | |
| 13 | 000000001 | 000000001 | 001 | 010 | 100 | 101 | 0000001 | 000001 | 000001 | 0000001 | 101 | 110 | 110 | 111 | |
| 14 | 001 | 010 | 0001 | 011 | 100 | 101 | 00001 | 0000001 | 00000001 | 00000001 | 0000001 | 000000001 | 000000001 | 111 | 111 |

*FIG. 7*

| zerosLeft | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | 1 | 0 | | | | | | | | | | | | | |
| 2 | 01 | 1 | 00 | | | | | | | | | | | | |
| 3 | 01 | 00 | 10 | 11 | | | | | | | | | | | |
| 4 | 10 | 01 | 001 | 000 | 11 | | | | | | | | | | |
| 5 | 011 | 010 | 101 | 001 | 10 | 000 | | | | | | | | | |
| 6 | 010 | 100 | 010 | 001 | 000 | 11 | 011 | | | | | | | | |
| 7 | 000 | 001 | 011 | 011 | 100 | 101 | 110 | 111 | | | | | | | |
| 8 | 001 | 010 | 010 | 0000 | 0001 | 100 | 101 | 110 | 111 | | | | | | |
| 9 | 001 | 0001 | 010 | 011 | 00000 | 100 | 101 | 101 | 111 | 110 | | | | | |
| 10 | 001 | 000000 | 000001 | 010 | 011 | 00001 | 000001 | 0000001 | 0001 | 00001 | 111 | | | | |
| 11 | 0000000 | 001 | 010 | 011 | 100 | 101 | 100 | 110 | 110 | 110 | 111 | 0001 | | | |
| 12 | 0000001 | 00000001 | 001 | 010 | 011 | 101 | 000001 | 0000000 | 101 | 0001 | 0001 | 111 | 00001 | | |
| 13 | 001 | 000001 | 010 | 011 | 100 | 101 | 0000001 | 0001 | 00001 | 00000001 | 110 300000000 | 110 300000000 | 111 300000001 | | |

| zerosLeft | Run_before (nonzeros_left = 5) | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 1 | 1 | 0 | | | | | | | | | | | | | |
| 2 | 1 | 01 | 00 | | | | | | | | | | | | |
| 3 | 000 | 1 | 01 | 001 | | | | | | | | | | | |
| 4 | 10 | 000 | 11 | 01 | 001 | | | | | | | | | | |
| 5 | 10 | 000 | 001 | 010 | 11 | 011 | | | | | | | | | |
| 6 | 11 | 001 | 001 | 011 | 011 | 100 | 101 | | | | | | | | |
| 7 | 000 | 010 | 010 | 100 | 100 | 101 | 110 | 111 | | | | | | | |
| 8 | 001 | 010 | 011 | 000 | 101 | 110 | 111 | 0001 | 0000 | | | | | | |
| 9 | 001 | 010 | 011 | 010 | 101 | 100 | 00000 | 0001 | 111 | 00001 | | | | | |
| 10 | 0001 | 000000 | 001 | 010 | 011 | 101 | 101 | 000001 | 110 | 111 | 00001 | | | | |
| 11 | 001 | 010 | 0001 | 011 | 100 | 101 | 110 | 111 | 0000001 | 00001 | 000001 | 0000000 | | | |

| zerosLeft | \multicolumn{15}{c}{Run_before (nonzeros_left = 6)} |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| 1 | 1 | 0 |  |  |  |  |  |  |  |  |  |  |  |  |  |
| 2 | 00 | 1 | 01 |  |  |  |  |  |  |  |  |  |  |  |  |
| 3 | 11 | 10 | 01 | 00 |  |  |  |  |  |  |  |  |  |  |  |
| 4 | 1 | 01 | 0000 | 0001 | 001 |  |  |  |  |  |  |  |  |  |  |
| 5 | 11 | 10 | 011 | 000 | 001 | 010 |  |  |  |  |  |  |  |  |  |
| 6 | 000 | 001 | 11 | 011 | 001 | 101 | 100 |  |  |  |  |  |  |  |  |
| 7 | 111 | 100 | 011 | 101 | 010 | 001 | 010 | 000 |  |  |  |  |  |  |  |
| 8 | 010 | 111 | 101 | 100 | 110 | 011 | 001 | 0001 | 0000 |  |  |  |  |  |  |
| 9 | 011 | 0001 | 111 | 110 | 101 | 100 | 010 | 00000 | 001 | 00001 |  |  |  |  |  |
| 10 | 110 | 001 | 010 | 111 | 101 | 011 | 100 | 0001 | 000000 | 00001 | 000001 |  |  |  |  |

FIG. 11

| zerosLeft | \multicolumn{15}{c}{Run_before (nonzeros_left = 7)} |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 1 | 1 | 0 | | | | | | | | | | | | | |
| 2 | 1 | 01 | 01 | | | | | | | | | | | | |
| 3 | 1 | 00 | 001 | 000 | | | | | | | | | | | |
| 4 | 1 | 01 | 001 | 0001 | 0000 | | | | | | | | | | |
| 5 | 10 | 11 | 01 | 001 | 011 | 0000 | | | | | | | | | |
| 6 | 11 | 000 | 001 | 010 | 100 | 100 | 101 | | | | | | | | |
| 7 | 000 | 001 | 010 | 011 | 100 | 101 | 110 | 111 | | | | | | | |
| 8 | 001 | 010 | 011 | 100 | 101 | 110 | 111 | 0000 | 0001 | | | | | | |
| 9 | 001 | 010 | 011 | 100 | 101 | 110 | 111 | 0001 | 00000 | 00001 | | | | | |

FIG. 12

| zerosLeft | \multicolumn{9}{c}{Run_before (nonzeros_left = B)} | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 1 | 1 | 0 | | | | | | | | | | | | | |
| 2 | 1 | 1 | 01 | 000 | | | | | | | | | | | |
| 3 | 1 | 00 | 001 | 000 | 001 | | | | | | | | | | |
| 4 | 10 | 01 | 11 | 01 | 0001 | 0000 | | | | | | | | | |
| 5 | 10 | 11 | 001 | 010 | 011 | 100 | 101 | 111 | | | | | | | |
| 6 | 000 | 11 | 010 | 011 | 100 | 101 | 110 | 0000 | 0001 | | | | | | |
| 7 | 000 | 001 | 010 | 011 | 100 | 101 | 110 | 111 | | | | | | | |
| 8 | 001 | 010 | 011 | 100 | 101 | 110 | 111 | | | | | | | | |

Run_before (nonzeros_left = 9)

| zerosLeft | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | 1 | 0 | | | | | | | | | | | | | |
| 2 | 1 | 01 | 00 | | | | | | | | | | | | |
| 3 | 1 | 01 | 001 | 000 | | | | | | | | | | | |
| 4 | 1 | 11 | 01 | 001 | 0000 | | | | | | | | | | |
| 5 | 10 | 11 | 01 | 010 | 0001 | 0000 | | | | | | | | | |
| 6 | 000 | 001 | 011 | 010 | 100 | 101 | 110 | | | | | | | | |
| 7 | 000 | 001 | 010 | 011 | 100 | 101 | 110 | 111 | | | | | | | |

| zerosLeft | Run_before (nonzeros_left = 10) | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 1 | 1 | 0 | | | | | | | | | | | | | |
| 2 | 1 | 00 | 01 | | | | | | | | | | | | |
| 3 | 1 | 01 | 001 | 000 | | | | | | | | | | | |
| 4 | 01 | 1 | 001 | 0001 | 0000 | | | | | | | | | | |
| 5 | 10 | 11 | 01 | 001 | 0001 | 0000 | | | | | | | | | |
| 6 | 00 | 000 | 001 | 010 | 011 | 100 | 101 | | | | | | | | |

| zerosLeft | 0 | 1 | 2 | 3 | 4 | Run_before (nonzeros_left = 12) | | | | | | | | | |
|---|---|---|---|---|---|---|---|---|---|---|---|---|---|---|---|
| | | | | | | 5 | 6 | 7 | 8 | 9 | 10 | 11 | 12 | 13 | 14 |
| 1 | 0 | 1 | | | | | | | | | | | | | |
| 2 | 1 | 0 | 01 | | | | | | | | | | | | | |
| 3 | 001 | 01 | 1 | 000 | | | | | | | | | | | | |
| 4 | 0 | 01 | 001 | 0000 | 0001 | | | | | | | | | | | |

| zerosLeft | 0 | 1 | 2 | 3 | 4 | Run_before (nonzeros_left = 13,14,15) | | | | | | | | | |
|---|---|---|---|---|---|---|---|---|---|---|---|---|---|---|---|
| | | | | | | 5 | 6 | 7 | 8 | 9 | 10 | 11 | 12 | 13 | 14 |
| 1 | 0 | 1 | | | | | | | | | | | | | |
| 2 | 1 | 00 | 01 | | | | | | | | | | | | | |
| 3 | 1 | 01 | 001 | 000 | | | | | | | | | | | | |

FIG. 17

VIDEO ENCODING AND DECODING APPARATUS AND METHOD

CROSS REFERENCE TO RELATED APPLICATION

This application claims the priority of Korean Patent Application No. 10-2008-0064903, filed on Jul. 4, 2008 in the KIPO (Korean Intellectual Property Office), the disclosure of which is incorporated herein in their entirety by reference. Further, this application is the National Phase application of International Application No. PCT/KR2009/003457, filed Jun. 26, 2009, which designates the United States and was published in Korean. Each of these applications is hereby incorporated by reference in their entirety into the present application.

TECHNICAL FIELD

The present disclosure relates to an apparatus and method for video encoding and decoding. More particularly, the present disclosure relates to an apparatus and method for video encoding and decoding adaptively incorporating video characteristics.

BACKGROUND ART

The statements in this section merely provide background information related to the present disclosure and may not constitute prior art.

Since video data has generally far greater data amount than voice or still image data, the storage of raw video data or its transmission takes up a large scale hardware resource like memory. Therefore, in order to avoid this problem, the video data may be compressed before storage or transmission to a decoder which receives the same for reproduction.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264.

DISCLOSURE

Technical Problem

Therefore, the present disclosure has been made for a method and an apparatus for encoding and decoding video data by adaptively reflecting the characteristics of the video so as to improve the coding efficiency.

Technical Solution

One aspect of the present disclosure provides an apparatus for encoding a video including: a predictor for predicting a pixel value of each pixel in a current block of the video to generate a predicted pixel value; a subtractor for calculating a difference between an original pixel value of the pixel in the current block and the predicted pixel value of the pixel in the current block to generate a residual signal; a transformer for transforming the residual signal into frequency coefficients; a quantizer for quantizing transformed frequency coefficients; and an encoder for encoding quantized frequency coefficients, wherein the encoding involves a run_before for representing the number of zero-level frequency coefficients interposed between a current non-zero frequency coefficient and a previous non-zero frequency coefficient and different variable length coding tables one of which is used to encode the run_before in encoding the quantized frequency coefficients.

Another aspect of the present disclosure provides a method for encoding a video including: predicting a pixel value of each pixel in a current block of the video to generate a predicted pixel value; calculating a difference between an original pixel value of the pixel in the current block and the predicted pixel value of the pixel in the current block to generate a residual signal; transforming the residual signal into frequency coefficients; quantizing transformed frequency coefficients; and encoding quantized frequency coefficients wherein the encoding involves a run_before for representing the number of zero-level frequency coefficients interposed between a current non-zero frequency coefficient and a previous non-zero frequency coefficient and different variable length coding tables one of which is used to encode the run_before in encoding the frequency coefficients.

Yet another aspect of the present disclosure provides a method for encoding a video including: scanning quantized frequency coefficients of respective pixels in a current block of the video to arrange them in a one-dimensional vector; encoding scanned quantized frequency coefficients by encoding a TotalCoeff, i.e., the number of non-zero frequency coefficients; levels, i.e., a coefficient value of non-zero frequency coefficients; a total_zero, i.e., the number of frequency coefficients of zeros occurring before a last non-zero frequency coefficient; and run_befores, i.e., the number of zero-level frequency coefficients interposed between a current non-zero frequency coefficient and a previous non-zero frequency coefficient in an orderly manner and using one of different variable length coding tables; and outputting encoded coefficients and numbers in a bitstream.

Yet another aspect of the present disclosure provides a method for decoding including: inputting through reading an inputted bitstream; decoding frequency coefficients from the bitstream by using information including a TotalCoeff, i.e., the number of non-zero frequency coefficients; levels, i.e., a coefficient value of non-zero frequency coefficients; a total_zero, i.e., the number of frequency coefficients of zeros occurring before a last non-zero frequency coefficient; and run_befores, i.e., the number of zero-level frequency coefficients interposed between a current non-zero frequency coefficient and a previous non-zero frequency coefficient and by using one of different variable length coding tables at decoding the run_before; and reconstructing decoded frequency coefficients back into the original block shape.

Advantageous Effects

According to the disclosure as described above, the present disclosure provides video encoding/decoding adaptively incorporating the video characteristics to improve the efficiency of the video encoding/decoding.

DESCRIPTION OF DRAWINGS

FIGS. 5a and 5b are diagrams of a variable length coding table of run_before according to zero_left in a variable length coding table of H.264/AVC;

FIGS. 6 to 17 are diagrams of different variable length coding tables for encoding run_before according to zero_left for non_zero_left valued 1, 2, 3, 4, 5, 6, 7, 8, 9, 10, 11, 12, 13, and 14, respectively;

MODE FOR INVENTION

Since a video on a screen is composed of as much as thirty frames per second with a short inter-frame interval, human eyes cannot distinguish the frames. For this reason, casting the thirty frames within a second will have the observing eyes believe the frames are a continuous movement.

If there is a similarity between a previous frame and a current frame, it is possible to make a prediction of a pixel value of one frame from a known value of a pixel constituting a preceding frame. This kind of prediction is called an inter prediction and is carried out between frames.

Such video data encoding and decoding are performed on the generic technology of motion prediction. Motion prediction is carried out in a way of referencing to a past frame on a temporal axis or to both of the past frame and a future frame. The reference frame is a frame that is used as a reference for encoding or decoding a current frame. Additionally, in the block-based video coding, a still image (frame) forming the video is divided by macroblocks and subblocks which constitute the macroblock so that the image is motion-predicted and encoded in units of a block.

Prediction of a pixel is also possible within a frame by taking advantage of the correlations among frame pixel signals, and is called an intra prediction.

In the disclosure, run_before refers to the number of zero-level frequency coefficients, which are from quantized frequency coefficients and interposed between the current non-zero frequency coefficient and a previous non-zero frequency coefficient. Non_zero_left is the number of previous non-zero frequency coefficients remaining at current non-zero frequency positions. TotalCoeff is the number of non-zero frequency coefficients, a level is the coefficient value of a non-zero frequency coefficient, and total_zeros is to encode the total number of frequency coefficients of zeros occurring before the last non-zero frequency coefficient.

In addition, TrailingOnes as used in the disclosure represents the total number of quantized frequency coefficients if their zig-zag scan has a coefficient with an absolute value of 1 at the consecutive end of the scan, and trailing_ones_sign_flag is the sign of the coefficients counted in TrailingOnes.

Figure 1:
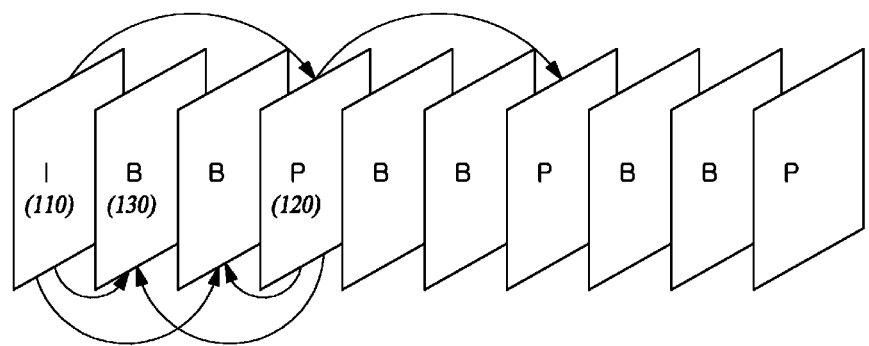
FIG. 1 is a diagram for showing video frames constituting a video and used in inter prediction.

FIG. 1 is a diagram for showing video frames constituting a video and used in inter prediction.

Referring to FIG. 1, video data is consisted of a series of still images. These still images are classified by a group of picture (GOP). One GOP has an I frame 110, P frames 120, and B frames 130. I frame 110 is supposed to be encoded by itself without using a reference frame, and P frames 120 and B frames 130 are encoded through motion estimation and compensation using a reference frame. Especially, B frames 130 are encoded by forwardly and backwardly (bidirectionally) predicting a past frame and a future frame, respectively.

Figure 2:
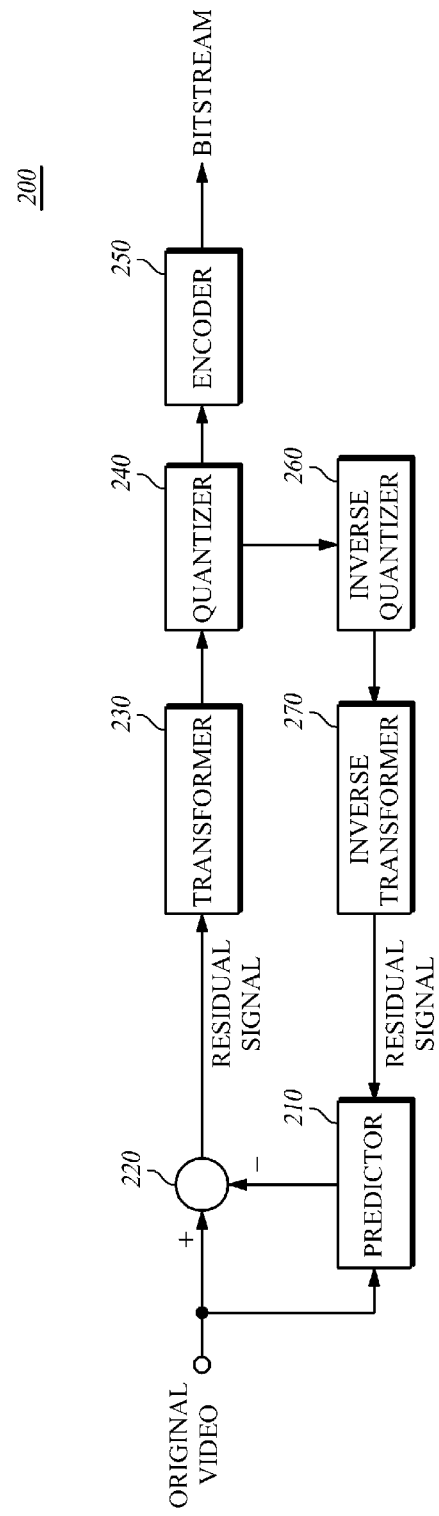
FIG. 2 is a block diagram for showing a video encoding apparatus according to an aspect.

FIG. 2 is a block diagram for showing a video encoding apparatus 200 according to an aspect.

Video encoding apparatus 200 includes a predictor 210, subtracter 220, transformer 230, quantizer 240, and encoder 250.

Video encoding apparatus 200 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

As described above, predictor 210 may predict the current block (or macroblock) by using either one or combined both of the motion prediction-based inter prediction and intra prediction for predicting a following pixel by taking advantage of the correlations among the pixel signals within a single frame.

For example, predictor 201 may be formed in two divided sections of a motion estimator (not shown) and a motion compensator (not shown). The motion estimator searches a motion predicted value of the current block's macroblock from the reference frame and outputs a motion difference as a motion vector. In other words, the desired macroblock to find is searched for within a predetermined search area of the reference frame to identify the closest macroblock and output its degree of motion as the motion vector. The motion compensator obtains a predicted macroblock corresponding to the obtained motion vector from the reference frame.

Alternatively, predictor 210 may be an intra predictor which predicts the current macroblock of the current frame by using an adjacent macroblock and neighboring the current block, and it predicts the predicted macroblock by calculating predicted pixel values of the respective pixels in the current block using one or more pixel values of one or more adjacent macroblocks. Here, the adjacent macroblock may be one or more macroblocks which were compressed previously of the current macroblock and are neighboring the current macroblock.

Subtractor 220 subtracts the predicted macroblock from the original video's macroblock to calculate the difference and generate a residual signal.

Transformer 230 transforms the residual signal generated by subtractor 220 into a frequency domain to obtain frequency coefficients. Here, transformer 230 performs the transform into frequency domain by using various techniques including discrete cosine transform (DCT) that transforms video signals on the time axis to those of the frequency axis. In the case of I frame described with reference to FIG. 1, transformer 230 transforms the macroblocks of the original video into the frequency domain.

Quantizer 240 performs quantization on the frequency coefficients which underwent transformation at transformer 230.

The macroblock of the original video subtracted by the predicted macroblock is called residual signal, the value of which is chosen to be encoded for reducing the data quantity in the encoding operation. Because errors are generated during the quantization, the bitstream of video data inherits errors occurred through the transform and quantization.

To obtain the reference frame, video encoding apparatus 200 may also incorporate an inverse quantizer 360 and an inverse transformer 370.

For the purpose of obtaining the reference frame, the quantized residual signal is summed with the predicted video from predictor 210 after going through inverse quantizer 360 and inverse transformer 270 and the sum is stored in a reference frame storage (not shown). In the case of the I frame, it proceeds through inverse quantizer 360 and inverse transformer 370 and is stored in the reference frame storage (not shown). The reference video stored in the storage contains the encoding errors generated during the transform and quanization of the original video frames.

In other words, assuming the original video is A and the predicted video is B, transformer 230 receives an input of the difference A-B between the original video and predicted video to perform the transform. In addition, the bitstream, that carries an error component E generated during the quantization and passes encoder 250 to an output, becomes (A-B)+E. In addition, since the reference video storage stores (A-B)+E with the predicted video B added thereto, the resultant A+E is stored as the reference video, which is the original video with the error contained.

Encoder 250 encodes the quantized frequency coefficients from quantizer 240 into the bitstream. The encoding technique may be the entropy encoding method, although other various encoding techniques may be used.

If all the frequency coefficients are '0', encoder 250 operates not by the entropy encoding but by using a coded block pattern, or else it encodes the values of the non-zero frequency coefficients in turn and the locations of the same coefficients.

In the following, a method is described on how encoder 250 operates if the quantized frequency coefficients are given as in Table 1.

TABLE 1

| 1(1) | 0(2) | 0(6) | 0(7) |
|------|------|------|------|
| 0(3) | 0(5) | 0(8) | 0(13) |
| 3(4) | 0(9) | 0(12) | 0(14) |
| 0(10) | 0(11) | 0(15) | 0(16) |

Figure 3:
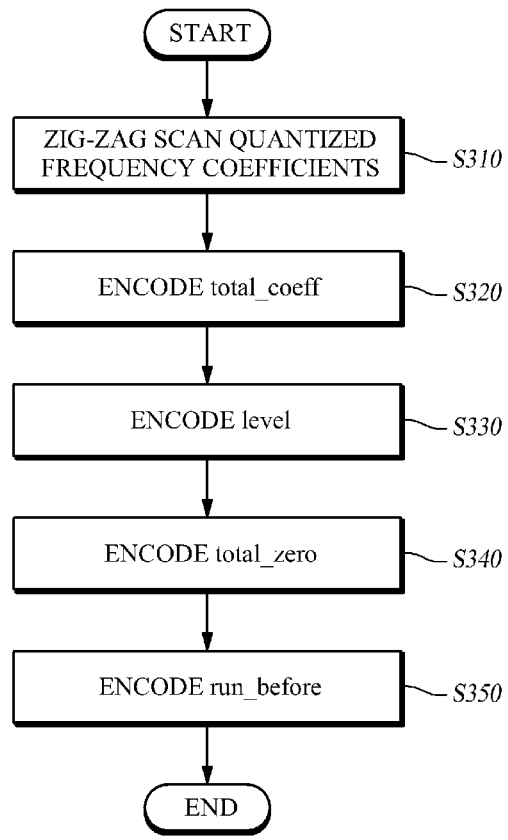
FIG. 3 is a flow diagram of a method for encoding frequency coefficients quantized in a encoder of FIG. 2.
Figure 4:
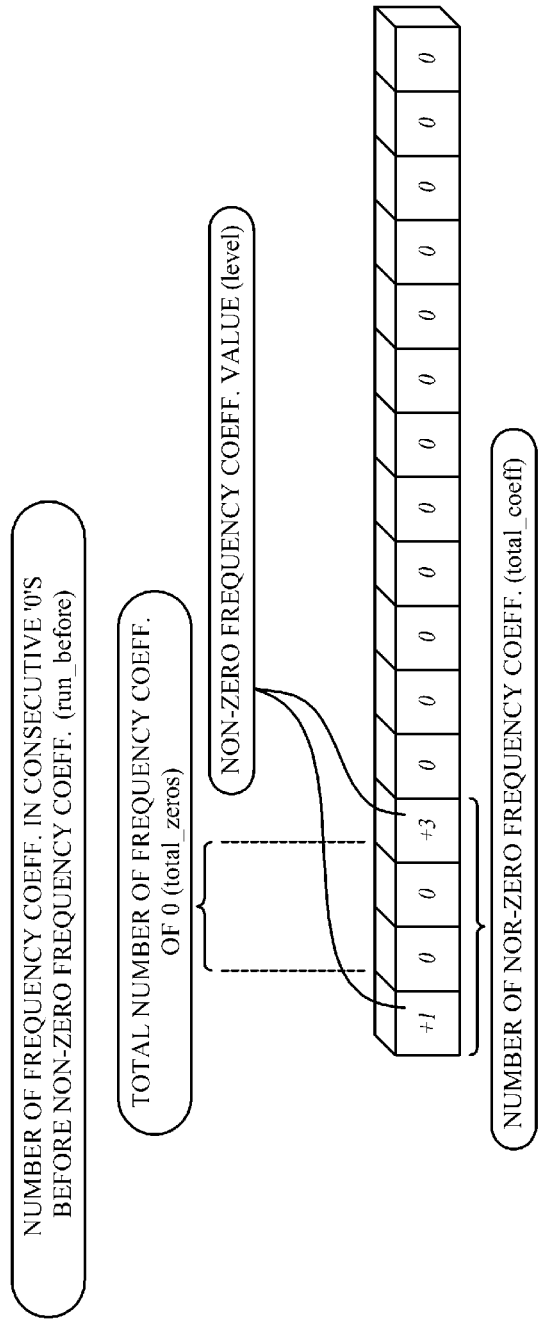
FIG. 4 is a diagram for showing a frequency coefficient string from zig-zag scanning the quantized frequency coefficients of FIG. 3.

FIG. 3 is a flow diagram of a method for encoding frequency coefficients quantized at encoder 250 of FIG. 2. FIG. 4 is a diagram for showing a frequency coefficient string from zig-zag scanning the quantized frequency coefficients of FIG. 3.

Referring to FIG. 3, the quantized frequency coefficients first undergo the zig-zag scanning in step S310. In this regard, the numbers bracketed represent the order of the zig-zag scanning. Therefore, the zig-zag scanned frequency coefficient string becomes 1(1) 0(2) 0(3) 3(4) 0(5) 0(6) 0(7) 0(8) 0(9) 0(10) 0(11) 0(12) 0(13) 0 (14) 0(15) 0(16), as shown in FIG. 4.

Next, of the zig-zag scanned frequency coefficient string, encoding is performed with respect to the total number of non-zero quantized frequency coefficients, total_coeff=2 in step S320. In S320 step, total_coeff is encoded by using, for example, a variable length coding table of H.264/AVC. Here, when encoding total_coeff, the encoding can be performed by selecting one of many variable length coding tables adaptively to the surrounding macroblock conditions.

Then, the coefficient value of non-zero frequency coefficients (level) is encoded in the opposite direction or in reverse order (from high frequency to DC) into +3, +1 and so on. In step S330 also, the variable length coding table of H.264/AVC may be used to encode level.

Next, the number (total_zeros=2) of zero frequency coefficients remaining in the DC direction from the last non-zero frequency coefficient (3(4)) is encoded in step S340.

In turn, the location of non-zero frequency coefficients in the DC direction from the last non-zero frequency coefficient (3(4)) is encoded by using the number (run_before) of the interposed consecutive '0's of frequency coefficients in step S350. At this time, by using one of different variable length coding tables, encoding may be performed on run_before dependant on the number (zero_left) of the frequency coefficients remaining at the current non-zero frequency coefficient locations and having the previous '0's. For example, according to the number (non_zero_left) of previous non-zero frequency coefficients remaining at current non-zero frequency positions, run_before with respect to zero_left may be encoded by using different variable length coding tables.

FIGS. 5a and 5b are diagrams of a variable length coding table of run_before according to zero_left in a variable length coding table of H.264/AVC.

In the run_before variable length coding table according to zero_left of FIGS. 5a and 5b, when encoding run_before for representing the position of the non-zero following frequency coefficients, the operation is carried out by varying the coding length based on information theory according to zero_left.

In this variable length coding table, for example, if zero_left is '2', run_before 0, 1, and 2 are encoded in this order into 1, 2, and 2-bit lengths, respectively. If zero_left is '3', run_before 0, 1, 2, and 3 are encoded into 2-bit length, respectively. Though this variable length coding table generally does the encoding with slightly less bits as run_before gets smaller, it is difficult to constitute a variable length coding table utilizing the general statistical video characteristics that low frequency portions show more non-zero frequency coefficients.

Therefore, based on the general statistical video characteristics of the denser non-zero frequency coefficients present at low frequency portions, with respect to the number (non_zero_left) of non-zero frequency coefficients existing in the DC direction of the current non-zero frequency coefficients, a plurality of variable length coding tables are respectively used for encoding run_before according to zero_left.

The table values in FIG. 5 at (a) represent the number of bits used to encode the corresponding run_before for the corresponding zero_left, and the table values in FIG. 5 at (b) represent encoding values used to encode the corresponding run_before for the corresponding zero_left. For example, FIG. 5 at (a) is to show assuming zero_left is '2' and run_before is '2' that run_before valued '2' is encoded with two bits, and FIG. 5 at (b) is to show assuming zero_left is '2' and run_before is '2' that run_before valued '2' is encoded by using '00'.

FIGS. 6 to 17 are diagrams of different variable length coding tables for encoding run_before according to zero_left for non_zero_left valued 1, 2, 3, 4, 5, 6, 7, 8, 9, 10, 11, 12, 13, and 14, respectively. The variable length coding tables in FIGS. 6 to 17 are for illustrative purpose only and they may be diversely changed or modified based on the general statistical video characteristics of the denser non-zero frequency coefficients occurring at low frequency portions. This use of different variable length coding tables for encoding run_before according to zero_left based on the general statistical video characteristics of the denser non-zero frequency coefficients at low frequency portions enables the effective encoding of the quantized frequency coefficients.

FIG. 5 at (a) and (b) shows assuming zero_left is '2' that run_before of 0, 1, 2 are respectively encoded in this order into 1, 1, 2 while FIG. 6 shows assuming non_zero_left is 1 or zero before is 2 that run_before of 0, 1, 2 are encoded in this order into 2, 2, 1 bit(s).

In FIG. 6, when run_before is relatively small as 0 or 1, the encoding results in a large bit number as 2 while the encoding is in a relatively small bit number of 1 when run_before is relatively large as 2 due to the reason as follows. The event where non_zero_left is 1 and zero_left is 2 represents that the entire frequency coefficients existing in the DC direction from the location of the current non-zero frequency coefficient are 3(1+2). The single presence of non-zero coefficient in this event is rather located within DC frequencies due to the characteristics of the video. Therefore, it is most probable that three frequency coefficients following the current location (frequency coefficient at the current location is not zero) is comprised of frequency (DC) not being <'0', 0, and 0>. Consequently, the best probability is run_length=2, so it is assigned a 1 bit, with 2 bits assigned to other events.

For the same reason, in the variable length coding tables of FIGS. 7 to 17 also, the more probable that the previous non-zero frequency coefficient comes before the current non-zero frequency coefficient, the smaller the bit number the run_before has.

In addition, this variable length coding table may become smaller as the number (non_zero_left) of the previous non-zero frequency coefficients becomes larger. In other words, in the variable length coding tables of FIGS. 6 to 17, as the non_zero_left values increase as 1, 2, 3, 4, 5, 6, 7, 8, 9, 10, 11, 12, 13, and 14, it can be seen that the size of the variable length coding tables decrease. For example, if non-zero_left is 14, zero_left becomes 1. In addition, if non_zero_left is 15, no remainder is necessary.

Referring back to FIG. 3, through steps S310 to S350 the encoded bitstream of the quantized frequency coefficients in Table 1 is comprised of 2(total_coeff), +3(level), +1(level), 2(total_zeros), and 2(run_before) in this order as shown in Table 2.

TABLE 2

| Info Type | Info Content | Info |
|---|---|---|
| total_coeff | Number of non-zero coefficients | 2 |
| level | Quantized Coefficient Value | +3 |
| level | Quantized Coefficient Value | +1 |
| total_zeros | Total Number of '0's before the Last Coefficient | 2 |
| run_before | Number of Consecutive '0's before Coefficient | 2 |

Another example of encoding the quantized frequency coefficients by encoder 250 is described with reference to Table 3 and FIG. 18.

TABLE 3

| 15(1) | −4(2) | 9(6) | −2(7) |
| 7(3) | 0(5) | 0(8) | 0(13) |
| 0(4) | 0(9) | −1(12) | 0(14) |
| 0(10) | 0(11) | 0(15) | 0(16) |

Figure 18:
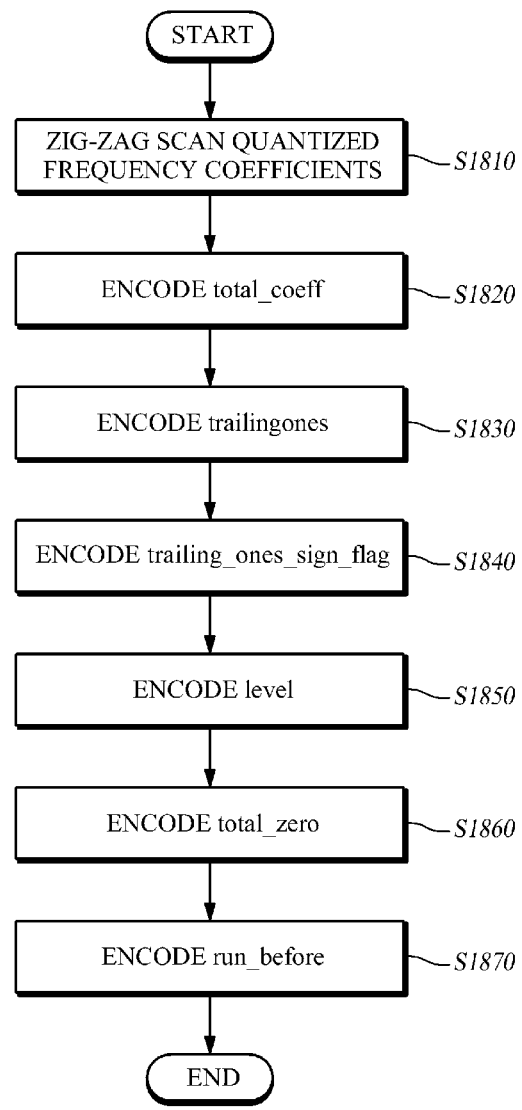
FIG. 18 is a flow diagram of another method for encoding frequency coefficients quantized in a encoder of FIG. 2.

FIG. 18 is a flow diagram of another method for encoding frequency coefficients quantized by an encoder of FIG. 2. At this time, repeated steps of FIG. 3 are just outlined for simplicity.

Referring to FIG. 18, the quantized frequency coefficients are first zig-zag scanned in step S1810. The quantized frequency coefficient string of Table 3 after the zig-zag scanning becomes 15(1) −4(2) 7(3) 0(4) 0(5) 9(6) −2(7) 0(8) 0(9) 1(10) 0(11) −1(12) 0(13) 0(14) 0(15) 0(16).

Next, the number (total_coeff=7) of non-zero quantized frequency coefficients (15, −4, 7, 9, −2, 1, −1) is encoded in step S1820.

Then, if there exist consecutive coefficients having absolute value of 1 at the end, the number (trailingOnes=2) of coefficients having consecutive absolute value of 1 and the sign (trailing_ones_sign_flag=−, +) of the coefficient having absolute value of 1 are encoded in a reverse order in steps S1830 and S1840. In these steps S1830 and S1840 also, trailingOnes and trailing_ones_sign_flag may be encoded by using, for example, the variable length coding table of H.264/AVC.

Then, non-zero frequency coefficient values (level) except the coefficients having absolute value of 1 are encoded in a reverse order (in the DC direction from the high frequency) into −2, +9, +7, −4, +15 in step S1850.

Next, the number (total_zeros=5) of zero frequency coefficients remaining in the DC direction from the last non-zero frequency coefficient (−1(12)) is encoded in step S1860.

Then, the location of non-zero frequency coefficient in the DC direction from the last non-zero frequency coefficient (−1(12)) is encoded by using the number (run_before) of the interposed consecutive '0's of frequency coefficients in step S1870. At this time, by using the variable length coding tables of FIGS. 6 to 17, a multitude of run_before are encoded in reverse order so that they correspond to the non-zero frequency coefficients (level). In other words, since run_before between −1(12) and +1(10) is 1, run_before between +1(10) and −2(7) is 2, run_before between −2(7) and +9(6) is 0, run_before between +9(6) and +7(3) is 2, run_before between +7(3) and −4(2) and between −4(2) and +15 are respectively 0, run_before in reverse order are 1, 2, 0, 2, 0, 0. The respective run_before 1, 2, 0, 2, 0, 0 select one of the variable length coding tables of FIGS. 6 to 17 taking into account those non_zero_left, and in accordance with zero_left from the selected variable length coding tables, the encoding values are determined.

The bitstream with the quantized frequency coefficients of Table 3 encoded through steps S1810 through S1870 is as Table 4. Specifically, the bitstream is composed of ordered information that is 7(total_coeff), 2(trailingOnes), −(trailing_ones_sign_flag), +(trailing_ones_sign_flag), −2(level), +9(level), +7(level), −4(level), +15(level), 5(total_zeros), 1(run_before), 2(run_before), 0(run_before), 2(run_before), 0(run_before), 0(run_before).

TABLE 4

| Info Type | Info |
|---|---|
| total_coeff | 7 |
| trailingOnes | 2 |
| trailing_ones_sign_flag | − |
| trailing_ones_sign_flag | + |
| level | −2 |
| level | +9 |
| level | +7 |
| level | −4 |
| level | +15 |
| total_zeros | 5 |
| run_before | 1 |
| run_before | 2 |
| run_before | 0 |
| run_before | 2 |

TABLE 4-continued

| Info Type | Info |
| --- | --- |
| run_before | 0 |
| run_before | 0 |

As described above, the video encoded by video encoding apparatus 200 into bitstream may then be transmitted in real time or non-real-time to video decoding apparatus for decoding the same followed by its reconstruction and reproduction into the video via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 19:
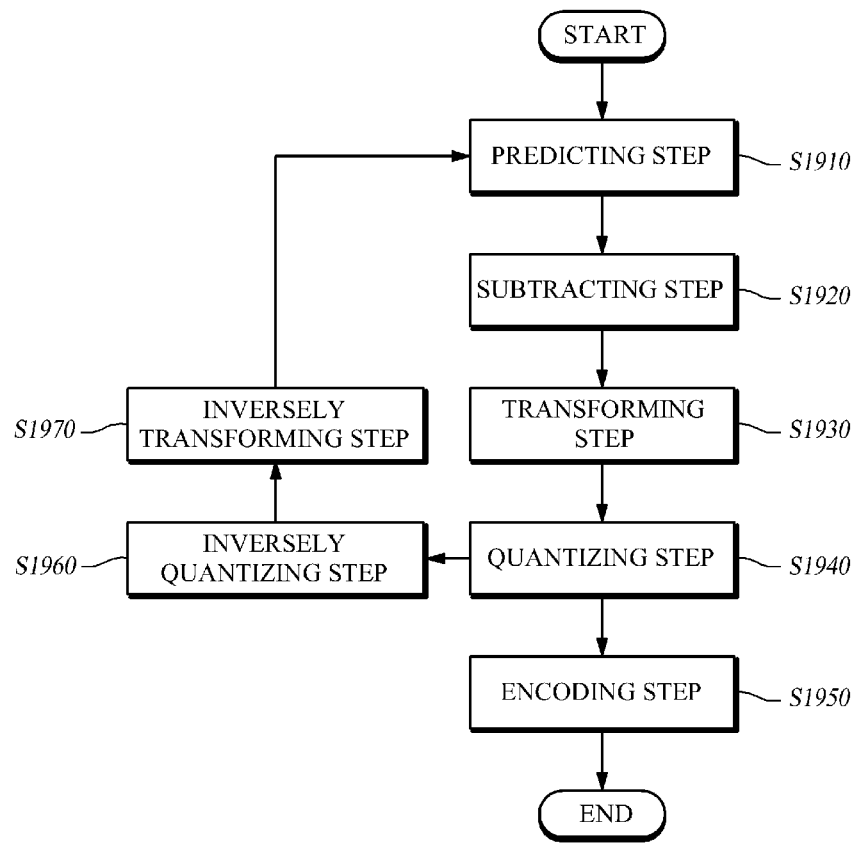
FIG. 19 is a flow diagram for showing a video encoding method according to another aspect.

FIG. 19 is a flow diagram for showing a video encoding method according to another aspect.

Referring to FIG. 19, the video encoding method in another aspect includes a predicting step S1910, a subtracting step S1920, a transforming step S1930, a quantizing step S1940, and an encoding step S1950.

Predicting step S1910 is to predict the pixel values of the respective pixels in the video's current block. Predicting step S1910 generates a predicted block from predicting the pixel values of the respective pixels by using previously encoded block of the previous frame and the adjacent block of the current frame.

To reduce the volume of the encoded data and thus enhance the coding efficiency, subtracting step S1920 calculates the difference (i.e. residual signal) between the pixel value of the original pixel of the current block to be encoded and the pixel value of the predicted pixel of the predicted block.

Transforming step S1930 is to transform the generated residual signal into frequency domain through DCT or other transform.

Quantizing step S1940 performs quantization with respect to the frequency domain transform of the frequency coefficients.

Encoding step S1950 is to encode the quantized frequency coefficients by using the variable length coding tables into the information types of Table 2 or 4. The specific procedures of encoding step S1950 were detailed by the encoding method described referring to FIGS. 3 to 18 and are not repeated herein.

Such context-based encoding in step S1950 of the quantized frequency coefficients by using the variable length coding tables is called context adaptive variable length coding (CAVLC). The disclosed aspects at the encoding steps for the quantized frequency coefficients are based on CAVLC.

Referring to FIG. 19, the video encoding method in another aspect may further include an inversely quantizing step S1960 and an inversely transforming step S1970.

Inversely quantizing step S1960 and inversely transforming step S1970 are to generate residual signals through inversely quantizing and inversely transforming the quantized frequency coefficients. In other words, the quantized residual signal passes through inversely quantizing step S1960 and inversely transforming step S1970 to reach predicting step S1910 where it is summed with the predicted video and stored as the reference frame.

The video encoded by video encoding apparatus 200 into the bitstream may then be transmitted to video decoding apparatus in real time or non-real-time for decoding the same followed by a reconstruction and reproduction into the video via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 20:
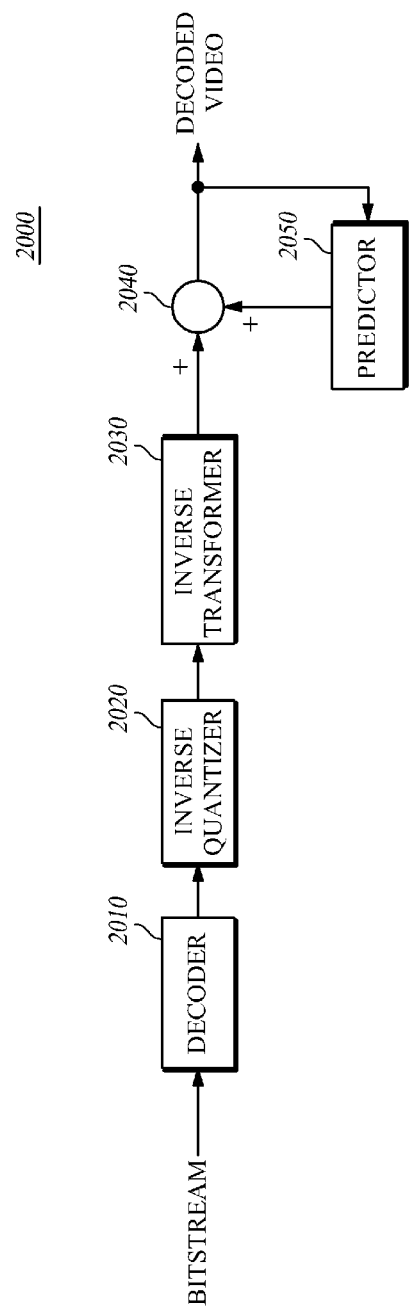
FIG. 20 is a schematic block diagram for showing an electronic configuration of a video decoding apparatus according to yet another aspect.

FIG. 20 is a schematic block diagram for showing an electronic configuration of a video decoding apparatus 2000 according to yet another aspect.

Video decoding apparatus 2000 in this aspect is to decode the video by predicting the current block of the video using one or more adjacent blocks of the current block, and includes a decoder 2010, an inverse quantizer 2020, an inverse transformer 2030, adder 2040, and a predictor 2050.

Much like video encoding apparatus 200 described with reference to FIG. 2, video decoding apparatus 1200 may be a personal computer or PC, notebook or laptop computer, personal digital assistant or PDA, portable multimedia player or PMP, PlayStation Portable or PSP, or mobile communication terminal, smart phone or such devices, and may represent a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

Decoder 2010 decodes the bitstream to extract the quantized frequency coefficients. Specifically, decoder 2010 decodes the bitstream which is the video encoded by video encoding apparatus 200 and extracts the quantized frequency coefficients which contain pixel information of the video current block.

Decoder 2010 uses the above described variable length coding tables to decode the quantized frequency coefficients from information contained in the bitstream and in Table 2 and Table 4. For example, from the Table 2 encoded information 2(total_coeff), +3(level), +1(level), 2(total_zeros), and 2(run_before) contained in the bitstream, decoder 2010 initially performs the decoding into the frequency coefficient string 1(1) 0(2) 0(3) 3(4) 0(5) 0(6) 0(7) 0(8) 0(9) 0(10) 0(11) 0(12) 0(13) 0(14) 0(15) 0(16) and then the transform into blocks of the number of the quantized frequency coefficients in Table 1. The specific decoding method will be described referring to FIGS. 21 and 22.

Inverse quantizer 2020 performs de-quantization with respect to the frequency coefficients from the bitstream by decoder 2010.

Inverse transformer 2030 inversely transforms the de-quantized frequency coefficients output from inverse quantizer 2020 into time-domain domain to generate a residual signal.

Adder 2030 adds predicted pixel values of the respective pixels of the predicted current block from predictor 2050 to the inversely transformed residual signal to reconstruct the original pixel value of the current block.

Figure 21:
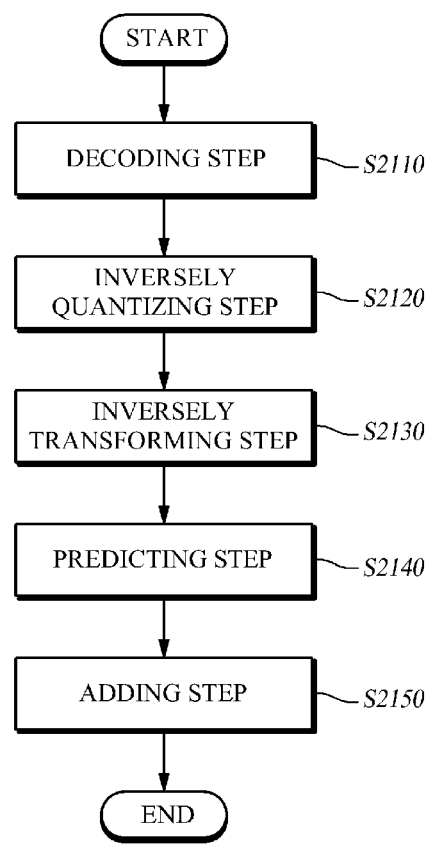
FIG. 21 is a flow diagram for showing a video decoding method according to yet another aspect.

FIG. 21 is a flow diagram for showing a video decoding method according to yet another aspect.

Upon receiving and storing the bitstream of video via wired/wireless communication networks, cables or the like, video decoding apparatus 1200 reproduces the video according to a user selected algorithm or an algorithm of a program under execution through predicting the current block of the video with one or more adjacent block with respect to the corresponding block of the previous frame or the current block.

To this effect, the video decoding method in this aspect includes a decoding step S2110 for reconstructing the bitstream information into the quantized frequency coefficients indicative of the video current block pixel information by using the variable length coding tables, a step (S2110) for inversely quantizing the extracted quantized frequency coefficients, a step S2130 for inversely transforming the inversely quantized frequency coefficients into time domain to reconstruct the residual signal, a predicting step S2140 for predicting the current block identified by the time-domain inversely transformed residual signal by using the corresponding block of the previous frame or the adjacent one or more blocks of the current block, and an adding step S2150 for adding the predicted pixel values of the respective pixels of the predicted current block from step S2140 to the residual signal of the inversely transformed current block from step S2130 to reconstruct the original pixel value of the current block.

Figure 22:
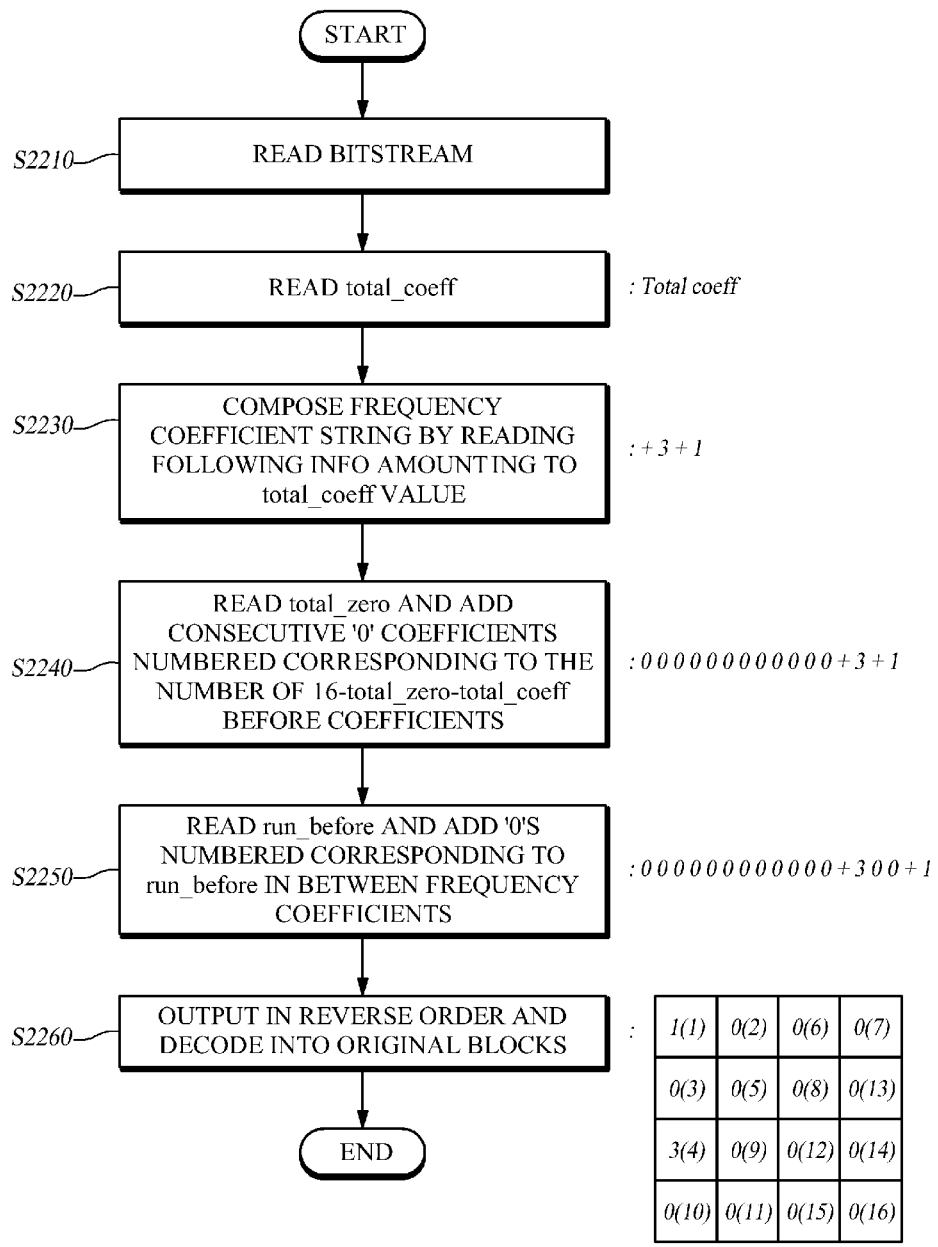
FIG. 22 a flow diagram for showing the decoding method for decoding blocks of frequency coefficients in a decoding step of FIG. 21 from an encoded bitstream.

FIG. 22 a flow diagram for showing the decoding method for decoding blocks of frequency coefficients in a decoding step of FIG. 21 from an encoded bitstream.

Referring to FIG. 22, a first step S321110 of the decoding method in this aspect reads the bitstream information 2(total_coeff), +3(level), +1(level), 2(total zeros), and 2(run_before) encoded in the method described referring to FIGS. 3 through 7.

Next, step S2220 reads first information 2(total_coeff) and then reads the following formation +3(level) and +1(level) as much as total_coeff value in step S2230. The frequency coefficients being read in step S2230 are +3 and +1.

Next step reads the following information 2(total_zeros) to attach '0' coefficients before the frequency coefficients obtained in step S2230 as much as 16-total_zeros-total_coeff=12 in step S2240. The frequency coefficient string obtained in step S2240 is 0 0 0 0 0 0 0 0 0 0 0 0 +3 +1.

Next step reads the following information 2(run_before) to attach '0' coefficients between the frequency coefficients obtained in step S2240 as much as the run_before value in step S2250. The frequency coefficient string obtained in step S2250 is 0 0 0 0 0 0 0 0 0 0 0 +3 0 0 +1. At this time, since run_before is encoded by using the variable length coding table of FIG. 6, step S2250 may also use the variable length coding table of FIG. 6 to encode the run_before value and then step S2260 is performed.

Next step outputs the frequency coefficient string obtained in step S2250 in reverse order and then reconstruct it back into the original block form as shown in Table 2 in step S2260.

Described above is a method for decoding the quantized frequency coefficient string shown in Table 2 by referring to FIG. 22, while the same method applies to decoding the quantized frequency coefficient string shown in Table 4. The number of frequency coefficients valued absolute 1 and their sign values are included and the original frequency coefficient string and original macroblock can be reconstructed by using these information and run_before, total_coeff, total_zeros value.

Since the above described bitstream information is encoded by the method of CAVLC using the variable length coding tables, the decoding steps may also use the variable length coding tables to perform decoding of the information and then reconstructing the quantized frequency coefficients to finally reconstruct the video block.

On the other hand, the described video encoding and decoding methods are writable in a computer program. Codes or code segments constituting such a program may easily be deduced by a computer programming person skilled in the art. The computer program may be stored in computer readable media, which in operation by a computer reading and execution the same can realize the video encoding and decoding methods. Included in the computer readable media are magnetic recording media, optical recording media, and carrier wave media.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

The invention claimed is:

1. An apparatus for encoding a video, the apparatus comprising:
    a predictor configured to predict a pixel value of each pixel in a current block of the video to generate a predicted pixel value;
    a subtractor configured to calculate a difference between an original pixel value of said each pixel in the current block and the predicted pixel value of said each pixel in the current block to generate a residual signal;
    a transformer configured to transform the residual signal into frequency coefficients;
    a quantizer configured to quantize the transformed frequency coefficients; and
    an encoder configured to
        scan the quantized frequency coefficients, and
        encode the scanned quantized frequency coefficients,
    wherein the encoder is configured to use a variable length coding table selected from a plurality of variable length coding tables for encoding a value of a run_before, the run_before representing the number of zero-level frequency coefficients interposed between a current non-zero frequency coefficient and a preceding non-zero frequency coefficient,
    wherein the variable length coding table is selected from the plurality of variable length coding tables based on a non_zero_left which represents the number of preceding non-zero frequency coefficients remaining at current non-zero frequency positions in a direction to a DC coefficient of the scanned quantized frequency coefficients, and
    wherein, in each of the plurality of variable length coding tables, a plurality of code words is specified for a combination of a plurality of values of run_befores and a plurality of values of zero_lefts wherein the encoder is further configured to encode the scanned quantized frequency coefficients by a context adaptive variable length coding wherein an encoding of a TotalCoeff, a level and a total zero is included in the encoding of the scanned quantized frequency coefficients, the TotalCoeff representing the number of non-zero frequency coefficients, the level representing a coefficient value of non-zero frequency coefficients, the total zero representing the number of frequency coefficients of zeros occurring before a last non-zero frequency coefficient; wherein the encoder is further configured to encode the scanned quantized frequency coefficients after a zig-zag scanning, in the order of the level, the totalzero, and the runbefore; wherein the encoder is further configured to encode a trailingOnes and a trailing ones sign flag, if there exist coefficients having consecutive absolute value of 1 among the scanned quantized frequency coefficients at the end, the trailingOnes representing the number of coefficients having consecutive absolute value of 1 at the end, the trailing-onestsignflag representing the sign of the trailingOnes, and wherein the trailingOnes and the trailing-onestsign-flag are located between the TotalCoeff and the level.

2. The apparatus of claim 1, wherein in the variable length coding tables, the more probable that the previous non-zero frequency coefficient comes before the current non-zero frequency coefficient, the smaller the bit number the run_before has.

3. The apparatus of claim 1, wherein the variable length coding table becomes smaller as the non_zero_left becomes larger.

4. A method for encoding a video, the method comprising:
predicting a pixel value of each pixel in a current block of the video to generate a predicted pixel value;
calculating a difference between an original pixel value of said each pixel in the current block and the predicted pixel value of said each pixel in the current block to generate a residual signal;
transforming the residual signal into frequency coefficients;
quantizing the transformed frequency coefficients;
scanning the quantized frequency coefficients; and
encoding the scanned quantized frequency coefficients,
wherein the encoding of the scanned quantized frequency coefficients comprises encoding a value of a run_before by using a variable length coding table selected from a plurality of variable coding tables, the run_before representing the number of zero-level frequency coefficients interposed between a current non-zero frequency coefficient and a preceding non-zero frequency coefficient, and
wherein the variable length coding table is selected from the plurality of variable length coding tables based on a non_zero_left which represents the number of preceding non-zero frequency coefficients remaining at current non-zero frequency positions in a direction to a DC coefficient of the scanned quantized frequency coefficients, and
wherein, in each of the plurality of variable length coding tables, a plurality of code words is specified for a combination of a plurality of values of run_befores and a plurality of values of zero_lefts wherein the scanned quantized frequency coefficients are encoded by a context adaptive variable length coding, wherein an encoding of a TotalCoeff, a level and a total zero is included in the encoding of the scanned quantized frequency coefficients, the TotalCoeff representing the number of non-zero frequency coefficients, the level representing a coefficient value of non-zero frequency coefficients, the total zero representing the number of frequency coefficients of zeros occurring before a last non-zero frequency coefficient; wherein the scanned quantized frequency coefficients are encoded after a zig-zag scanning with levels, the totalzero, and run_befores; further comprising encoding a trailingOnes and a trailing ones sign flag, if there exist coefficients having consecutive absolute value of 1 among the scanned quantized frequency coefficients at the end, the trailing_Ones representing the number of coefficients having consecutive absolute value of 1 at the end the trailing-ones_sign_flag representing the sign of the trailing_Ones, and wherein the trailing_Ones and the trailing-onestsign-flag are located between the TotalCoeff and the level.

5. The method of claim 4, wherein in the variable length coding tables, the more probable that the previous non-zero frequency coefficient comes before the current non-zero frequency coefficient, the smaller the bit number the run_before has.

6. The method of claim 4, wherein the variable length coding table becomes smaller as remaining value of the non_zero_left becomes larger.

7. A method for encoding a video, the method comprising:
scanning quantized frequency coefficients of respective pixels in a current block of the video to arrange scanned quantized frequency coefficients in a one-dimensional vector;
encoding the scanned quantized frequency coefficients by encoding a TotalCoeff, a level, a total_zero and a run_before in an orderly manner, the TotalCoeff representing the number of non-zero frequency coefficients, the level representing a coefficient value of non-zero frequency coefficients, the total_zero representing the number of frequency coefficients of zeros occurring before a last non-zero frequency coefficient, the run_before representing the number of zero-level frequency coefficients interposed between a current non-zero frequency coefficient and a preceding non-zero frequency coefficient; and
outputting the encoded coefficients and numbers in a bitstream,
wherein the encoding of the scanned quantized frequency coefficients comprises:
selecting a variable length coding table from a plurality of variable length coding tables for encoding a value of the run_before based on a non_zero_left which represents the number of preceding non-zero frequency coefficients remaining at current non-zero frequency positions in a direction to a DC coefficient of the scanned quantized frequency coefficients, and
encoding the scanned quantized frequency coefficients by encoding a value of the run_before by using the selected variable length coding table, and
wherein, in each of the plurality of variable length coding tables, a plurality of code words is specified for a combination of a plurality of values of run_befores and a plurality of values of zero_lefts further comprising encoding a trailingOnes and a trailing ones sign flag, if there exist coefficients having consecutive absolute value of 1 among the scanned quantized frequency coefficients at the end, the trailingOnes representing the number of coefficients having consecutive absolute value of 1 at the end the trailing-ones-sign-flag representing the sign of the trailingOnes, and wherein the trailingOnes and the trailing-ones-sign-flag are located between the TotalCoeff and the level.

8. The method of claim 7, wherein, in the variable length coding tables, the more probable that the previous non-zero frequency coefficient comes before the current non-zero frequency coefficient, the smaller the bit number the run_before has.

9. The method of claim 7, wherein the variable length coding table becomes smaller as the non_zero_left becomes larger.

10. The method of claim 7, wherein the encoded coefficients and numbers are output in reverse order if the level and the run_before are plural numbers.

11. A method for decoding, the method comprising:
loading an inputted bitstream;
decoding frequency coefficients from the bitstream by using information including a TotalCoeff, a level and a run_before, the TotalCoeff representing the number of non-zero frequency coefficients, the level representing a coefficient value of non-zero frequency coefficients, the run_before representing the number of zero-level frequency coefficients interposed between a current non-zero frequency coefficient and a preceding non-zero frequency coefficient; and reconstructing the decoded frequency coefficients back into the original block shape, wherein the decoding of the frequency coefficients comprises:

selecting a variable length coding table from a plurality of variable length coding tables for decoding a value of the run_before, based on a non_zero_left which represents the number of preceding non-zero frequency coefficients remaining at current non-zero frequency positions in a direction to a DC coefficient of the decoded frequency coefficients, and decoding the frequency coefficients by decoding a value of the run_before by using the selected variable length coding table, and wherein, in each of the plurality of variable length coding tables, a plurality of code words is specified for a combination of a plurality of values of run_befores and a plurality of values of zero_lefts wherein the inputted bitstream includes a trailingOnes and a trailing ones sign flag, if there exist coefficients having consecutive absolute value of 1 at the end, the trailingOnes representing the number of coefficients having consecutive absolute value of 1 at the end the trailing-onestsignflag representing, the sign of the trailingOnes between the TotalCoeff and the level, and wherein the frequency coefficients are decoded by decoding the trailingOnes and the trailing-onestsignflag.

12. The method of claim 11, wherein, in the variable length coding tables, the more probable that the previous non-zero frequency coefficient comes before the current non-zero frequency coefficient, the smaller the bit number the run_before has.

13. The method of claim 11, wherein the variable length coding table becomes smaller as remaining value of the non_zero_left becomes larger.

* * * * *